US012732101B2

(12) United States Patent
Zhong et al.

(10) Patent No.: US 12,732,101 B2
(45) Date of Patent: Sep. 8, 2026

(54) DC POWER CONVERSION DEVICE FOR BRIDGING NEW ENERGY GENERATION, ENERGY STORAGE AND MICROGRID

(71) Applicant: National Engineering Research Center of Advanced Energy Storage Materials (Shenzhen) Co., Ltd, Shenzhen (CN)

(72) Inventors: Faping Zhong, Shenzhen (CN); Mingxing Tang, Shenzhen (CN); Peihong Zhao, Shenzhen (CN)

(73) Assignee: National Engineering Research Center of Advanced Energy Storage Materials (Shenzhen) Co., Ltd., Shenzhen (CN)

( * ) Notice: Subject to any disclaimer, the term of this patent is extended or adjusted under 35 U.S.C. 154(b) by 58 days.

(21) Appl. No.: 18/557,915

(22) PCT Filed: Sep. 6, 2023

(86) PCT No.: PCT/CN2023/117176
§ 371 (c)(1),
(2) Date: Oct. 27, 2023

(87) PCT Pub. No.: WO2024/169165
PCT Pub. Date: Aug. 22, 2024

(65) Prior Publication Data

US 2025/0088101 A1 Mar. 13, 2025

(30) Foreign Application Priority Data

Feb. 17, 2023 (CN) ........................ 202310131418.5

(51) Int. Cl.
*H02M 3/155* (2006.01)
*H02J 7/00* (2006.01)
(Continued)

(52) U.S. Cl.
CPC ........... *H02M 3/155* (2013.01); *H02J 7/0047* (2013.01); *H02J 7/0063* (2013.01); *H02J 7/0068* (2013.01);
(Continued)

(58) Field of Classification Search
CPC ........ H02M 3/155; H02M 1/14; H02J 7/0047; H02J 7/0063; H02J 7/0068; H02J 7/35; H02J 2207/20
(Continued)

(56) References Cited

U.S. PATENT DOCUMENTS 12,244,173 B2 * 3/2025 Kasper .................... H02J 7/345
2016/0344214 A1 * 11/2016 Petersen ................ H02M 3/07
(Continued)

*Primary Examiner* — Yemane Mehari
(74) *Attorney, Agent, or Firm* — SYNCODA LLC; Feng Ma

(57) ABSTRACT

The present invention provides a DC power conversion device for bridging new energy generation, energy storage and microgrid. The DC power conversion device includes a direct current power output port (Vout+) connected in series to a denoising circuit to provide a stable direct current output, wherein the denoising circuit includes a differential amplifier, a standard voltage output module, a current sampling circuit, a transient response enhancement circuit, a PMOS power transistor, and four resistance negative feedback networks, wherein the differential amplifier, the standard voltage output module, the current sampling circuit, the transient response enhancement circuit, the PMOS power transistor, and the four resistance negative feedback networks form a closed loop; the standard voltage output module is connected to the differential amplifier; an input power supply is connected to a resistor R3, the standard voltage output module and the PMOS power transistor.

6 Claims, 3 Drawing Sheets

(51) Int. Cl.
*H02J 7/35* (2006.01)
*H02M 1/14* (2006.01)

(52) U.S. Cl.
CPC ................. *H02J 7/35* (2013.01); *H02M 1/14* (2013.01); *H02J 2207/20* (2020.01)

(58) Field of Classification Search
USPC .......................................................... 323/282
See application file for complete search history.

(56) References Cited

U.S. PATENT DOCUMENTS

2020/0336080 A1* 10/2020 Yang ..................... H02M 3/156
2023/0025867 A1* 1/2023 Woo .................. H02M 3/33584
2023/0155507 A1* 5/2023 Lee ....................... H02J 7/0068
363/13

* cited by examiner

DC POWER CONVERSION DEVICE FOR BRIDGING NEW ENERGY GENERATION, ENERGY STORAGE AND MICROGRID

CROSS REFERENCE OF RELATED APPLICATION

The present application is a 371 of international Application PCT/CN2023/117176, filed Sep. 6, 2023, which claims priority to Chinese Patent Application No. 202310131418.5 filed Feb. 17, 2023. The contents of the applications are incorporated herein by reference in their entireties.

TECHNICAL FIELD

The present invention relates to the field of power supply technologies, and in particular to a DC power conversion device for bridging new energy generation, energy storage and microgrid.

BACKGROUND

In an existing large-scale battery energy storage system, when energy storage battery packs of the same type or different types operate in parallel, the energy storage battery packs are generally connected to a direct current bus in parallel through different bidirectional DC/DC converters, or connected to an alternating current bus in parallel through a bidirectional DC/AC inverter to transmit/take power to/from a specified power network or supply power to a power terminal load at the same time or different times according to a planned control strategy; and the purpose of energy storage is achieved in a process of reversely charging the battery packs by the alternating current-direct current bus. For such a battery energy storage mode, each battery pack has only one inlet and outlet relative to the bus, and the direction of current needs to be switched repeatedly during charging and discharging, so that a conversion time difference exists, which affects a response speed of the system, and meanwhile, there are some safety risks when switching with high power loads. Moreover, a filtering and denoising circuit of an existing voltage conversion circuit is relatively simple, and cannot be effectively designed according to the characteristics of the circuit itself.

SUMMARY

The present invention is intended to provide a DC power conversion device for bridging new energy generation, energy storage and microgrid. The DC power conversion device has a simple structure and is easy to modularize, and can achieve functions of smooth buffering and dynamic storage of input-output electric energy active at the same time.

The present invention is implemented by the following solutions: provided is a DC power conversion device for bridging new energy generation, energy storage and microgrid, including a direct current generated power input port Vin+, a direct current regulated power output port Vout+, an energy storage battery pack access port Vbat+, a common negative electrode port V−, a forward charging control insulated gate bipolar transistor (IGBT) T-ci, a charging energy storage inductor Lc, a charging flyback diode D1, a discharging control IGBT T-d, a discharging energy storage inductor Ld, a discharging flyback diode D2, an input-output straight-through and reverse isolation diode D4, and an energy storage battery pack; wherein the direct current power output port Vout+ is connected in series to a denoising circuit to provide a stable direct current output, and the denoising circuit includes a differential amplifier, a standard voltage output module, a current sampling circuit, a transient response enhancement circuit, a PMOS power transistor, and four resistance negative feedback networks; wherein the differential amplifier, the standard voltage output module, the current sampling circuit, the transient response enhancement circuit, the PMOS power transistor, and the four resistance negative feedback networks form a closed loop, the standard voltage output module is connected to the differential amplifier, an input power supply is connected to a resistor R3, the standard voltage output module and the PMOS power transistor, the standard voltage output module is connected to the differential amplifier, the differential amplifier is connected to an input end of the transient response enhancement circuit, an output end of the transient response enhancement circuit is connected to the PMOS power transistor and an input end of the current sampling circuit, an output end of the current sampling circuit is connected to a resistor R1, and an output end of the PMOS power transistor is connected to a resistor R4, wherein the standard voltage output module uses a band-gap reference circuit to generate a voltage, a resistor R2 is grounded, and the differential amplifier is connected to the resistor R1.

Preferably, an anode of the input-output straight-through and reverse isolation diode D4 and a collector of the forward charging control IGBT T-ci are respectively connected to the direct current generated power input port Vin+, a cathode of the input-output straight-through and reverse isolation diode D4 and a cathode of the discharging flyback diode D2 are respectively connected to the direct current regulated power output port Vout+, an emitter of the forward charging control IGBT T-ci is connected to a cathode of the charging flyback diode D1, a collector of the discharging control IGBT T-d is connected to an anode of the discharging flyback diode D2, one end of the charging energy storage inductor Lc is connected to a connecting end of the forward charging control IGBT T-ci and the charging flyback diode D1, one end of the discharging energy storage inductor Ld is connected to a connecting end of the discharging control IGBT T-d and the discharging flyback diode D2, the other end of the charging energy storage inductor Lc, the other end of the discharging energy storage inductor Ld and a positive electrode end of the energy storage battery pack are respectively connected to the energy storage battery pack access port Vbat+, and an anode of the charging flyback diode D1, a negative electrode end of the energy storage battery pack and an emitter of the discharging control IGBT T-d are respectively connected to the common negative electrode port V−.

Preferably, the DC power conversion device further includes a reverse charging control IGBT T-co, a first reverse charging isolation diode D and a second reverse charging isolation diode D3, wherein the second reverse charging isolation diode D3 is connected in series to a connecting line of the forward charging control IGBT T-ci and the charging flyback diode D1, a cathode of the second reverse charging isolation diode D3 is connected to one end of the charging energy storage inductor Lc, a collector of the reverse charging control IGBT T-co is connected to the direct current regulated power output port Vout+, an emitter of the reverse charging control IGBT T-co is connected to an anode of the first reverse charging isolation diode D, a cathode of the first reverse charging isolation diode D is connected to one end of the charging energy storage inductor Lc, and the reverse charging control IGBT T-co and the first reverse charging isolation diode D together form a reverse independent charging loop.

Preferably, the forward charging control IGBT T-ci, the charging energy storage inductor Lc and the charging flyback diode D1 together form a buck charging circuit, and the discharging control IGBT T-d, the discharging energy storage inductor Ld and the discharging flyback diode D2 together form a boost discharging circuit; and the buck charging circuit, the energy storage battery pack and the boost discharging circuit together form an "H"-shaped DC-B-DC circuit architecture.

Preferably, the DC power conversion device further includes a high-frequency filter capacitor and a low-frequency filter electrolytic capacitor, wherein a positive electrode end of the low-frequency filter electrolytic capacitor is connected to the energy storage battery pack access port Vbat+, a negative electrode end of the low-frequency filter electrolytic capacitor is connected to the common negative electrode port V−, and two ends of the high-frequency filter capacitor are connected to two ends of the low-frequency filter electrolytic capacitor in parallel.

Preferably, a battery management system is arranged in the energy storage battery pack, and the energy storage battery pack may be a nickel-metal hydride battery pack, a lithium ion battery pack, a lead-acid battery pack, and the like. Gates of all IGBTs (including the forward charging control IGBT T-ci, the discharging control IGBT T-d and the reverse charging control IGBT T-co) are respectively connected to corresponding IGBT drivers, and the forward charging control IGBT T-ci, the discharging control IGBT T-d, and the reverse charging control IGBT T-co are controlled by their respective corresponding IGBT drivers.

Preferably, direct current generated power input ports Vin+, direct current regulated power output ports Vout+, energy storage battery pack access ports Vbat+, and common negative electrode ports V− of several DC power conversion devices are connected in one-to-one correspondence in parallel to achieve a single-path power expansion function, and in this case, types of the energy storage battery packs connected to the energy storage battery pack access ports Vbat+ are the same, for example, the energy storage battery packs are all nickel-metal hydride battery packs, lithium ion battery packs, and the like; the direct current generated power input ports Vin+, the direct current regulated power output ports Vout+, and the common negative electrode ports V− of several DC power conversion devices are connected in one-to-one correspondence in parallel, each energy storage battery pack access port Vbat+ is independent to achieve a capacity expansion function or a hybrid energy storage combination function, and the types of the energy storage battery packs correspondingly connected to the energy storage battery pack access ports Vbat+ are all the same or partly the same, partly different or completely different, for example, when a quantity of the DC power conversion devices is three, the energy storage battery packs correspondingly connected to the energy storage battery pack access ports Vbat+ of the three DC power conversion devices are all nickel-metal hydride battery packs; or the energy storage battery packs correspondingly connected to the energy storage battery pack access ports Vbat+ of two of the DC power conversion devices are nickel-metal hydride battery packs, and the energy storage battery pack correspondingly connected to the energy storage battery pack access port Vbat+ of the other DC power conversion device is a lithium ion battery pack; or the energy storage battery pack correspondingly connected to the energy storage battery pack access port Vbat+ of one DC power conversion device is a nickel-metal hydride battery pack, the energy storage battery pack correspondingly connected to the energy storage battery pack access port Vbat+ of one DC power conversion device is a lithium ion battery pack, and the energy storage battery pack correspondingly connected to the energy storage battery pack access port Vbat+ of one DC power conversion device is a lead-acid battery pack.

The present invention provides a DC power conversion device for bridging new energy generation, energy storage and microgrid, and beneficial technical effects that can be achieved are as follows:

1. The DC power conversion device provided in the present invention has a simple structure and is easy to be modularized, forming an "H"-shaped structure. The charging and discharging circuits can either work independently at different times, or work simultaneously based on the capacitor effect of the battery packs.
2. Due to unidirectional characteristics of the charging-discharging circuits, the discharging side is always active without bidirectional switching, which improves the response speed, safety, and reliability of the energy storage system.
3. According to the present invention, various types of battery packs can be grouped and connected in parallel, an output ratio is coordinated by the control system according to load demands during the application, and the battery packs are always active without switching. Moreover, energy input at the power generation side is responded at any time, so that the energy storage battery packs are active all the time in a dynamic state of adjusting between energy input and output, and play a better role as an electric energy buffer.
4. The reverse charging control IGBT (T-co) and the first reverse charging isolation diode (D) together form a reverse independent charging loop, which greatly improves the reverse charging efficiency.
5. The denoising circuit provided in the present application can reduce voltage ripples. Through a feedback network composed of the resistor R1, the resistor R2, the resistor R3, and the resistor R4, outputs of the transient response circuit, the current sampling circuit, and the PMOS power transistor are comprehensively adjusted respectively, and output voltage is fed back to the differential amplifier. The resistance network greatly enhances the stability of the output voltage; the transient response enhancement circuit greatly enhances the transient response capability.
6. According to the present application, the use of the PMOS transistor and the arrangement of the resistance feedback network structure have a great inhibitory effect on voltage noise.

BRIEF DESCRIPTION OF THE DRAWINGS

To explain the technical solutions in the embodiments of the present invention or in the prior art more clearly, the drawings used in the description of the embodiments or the prior art will be briefly introduced below. Obviously, the drawings in the following description show merely some embodiments of the present invention. For those of ordinary skill in the art, other drawings can be obtained based on these drawings without creative efforts.

DETAILED DESCRIPTION

The technical solutions in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skill in the art without creative efforts shall fall within the protection scope of the present invention.

Embodiment 1

Figure 1:
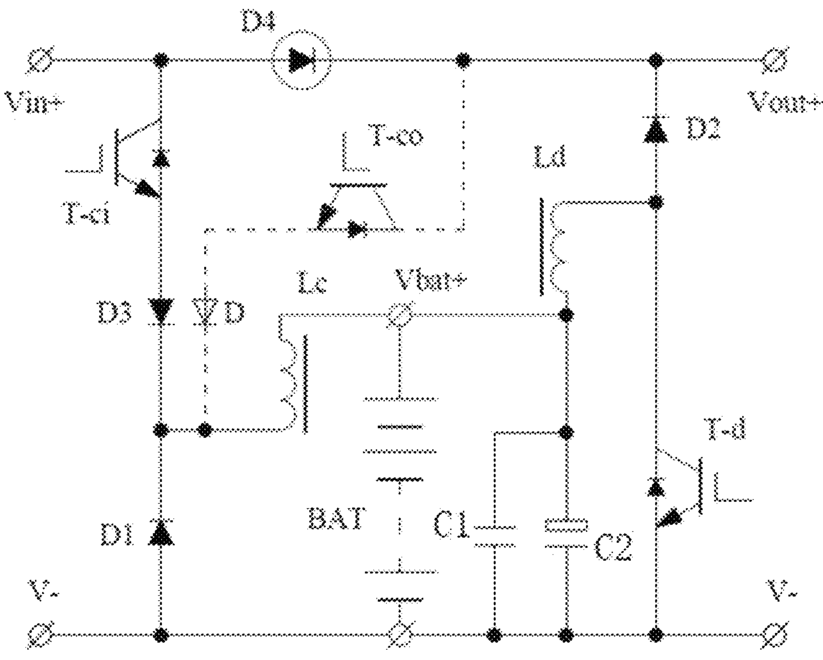
FIG. 1 is a block diagram of a circuit of a DC power conversion device based on a resistance feedback network according to Embodiment 1.
Figure 2:
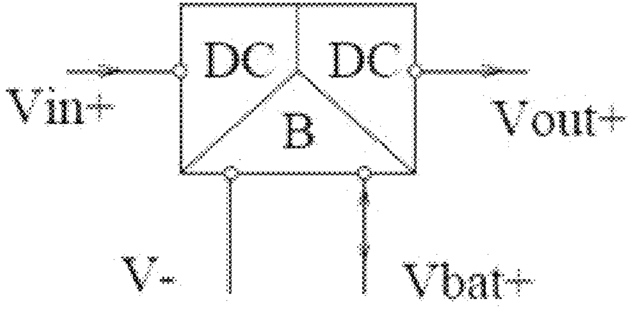
FIG. 2 is a simplified diagram of the DC power conversion device in FIG. 1.

As shown in FIG. 1, a DC power conversion device for bridging new energy power generation, energy storage, and microgrids includes a direct current generated power input port Vin+, a direct current regulated power output port Vout+, an energy storage battery pack access port Vbat+, a common negative electrode port V−, a forward charging control insulated gate bipolar transistor (IGBT) T-ci, a charging energy storage inductor Lc, a charging flyback diode D1, a discharging control IGBT T-d, a discharging energy storage inductor Ld, a discharging flyback diode D2, an input-output straight-through and reverse isolation diode D4, an energy storage battery pack BAT, a reverse charging control IGBT T-co, a first reverse charging isolation diode D, a second reverse charging isolation diode D3, a high-frequency filter capacitor C1, and a low-frequency filter electrolytic capacitor C2; an anode of the input-output straight-through and reverse isolation diode D4 and a collector of the forward charging control IGBT T-ci are respectively connected to the direct current generated power input port Vin+, a cathode of the input-output straight-through and reverse isolation diode D4 and a cathode of the discharging flyback diode D2 are respectively connected to the direct current regulated power output port Vout+, an emitter of the forward charging control IGBT T-ci is connected to a cathode of the charging flyback diode D1 through the second reverse charging isolation diode D3 and a cathode of the second reverse charging isolation diode D3 is connected to the cathode of the charging flyback diode D1, a collector of the discharging control IGBT T-d is connected to an anode of the discharging flyback diode D2, one end of the charging energy storage inductor Lc is connected to a connecting end of the second reverse charging isolation diode D3 and the charging flyback diode D1, a collector of the reverse charging control IGBT T-co is connected to the direct current regulated power output port Vout+, an emitter of the reverse charging control IGBT T-co is connected to an anode of the first reverse charging isolation diode D, a cathode of the first reverse charging isolation diode D is connected to one end of the charging energy storage inductor Lc, one end of the discharging energy storage inductor Ld is connected to a connecting end of the discharging control IGBT T-d and the discharging flyback diode D2, the other end of the charging energy storage inductor Lc, the other end of the discharging energy storage inductor Ld, and a positive electrode end of the energy storage battery pack BAT are respectively connected to the energy storage battery pack access port Vbat+, a positive electrode end of the low-frequency filter electrolytic capacitor C2 is connected to the energy storage battery pack access port Vbat+, two ends of the high-frequency filter capacitor C1 are connected in parallel to two ends of the low-frequency filter electrolytic capacitor C2, and an anode of the charging flyback diode D1, a negative electrode end of the energy storage battery pack BAT, an emitter of the discharging control IGBT T-d, and a negative electrode end of the low-frequency filter electrolytic capacitor C2 are respectively connected to the common negative electrode port V−; the forward charging control IGBT T-ci, the charging energy storage inductor Lc, the charging flyback diode D1, and the second reverse charging isolation diode D3 together form a buck charging circuit, the discharging control IGBT T-d, the discharging energy storage inductor Ld, and the discharging flyback diode D2 together form a boost discharging circuit, the reverse charging control IGBT T-co and the first reverse charging isolation diode D together form a reverse independent charging loop, and the buck charging circuit, the energy storage battery pack, and the boost discharging circuit together form an "H"-shaped DC-B-DC circuit architecture; and a battery management system is arranged in the energy storage battery pack, and the energy storage battery pack may be a nickel-metal hydride battery pack, a lithium ion battery pack, a lead-acid battery pack, and the like. FIG. 2 is a simplified diagram of the DC power conversion device in FIG. 1. The charging flyback diode D1, the discharging flyback diode D2, the first reverse charging isolation diode D, and the second reverse charging isolation diode D3 are all of Schottky type, and specific electrical parameters of the forward charging control IGBT T-ci, the charging energy storage inductor Lc, the discharging control IGBT T-d, the discharging energy storage inductor Ld, and the reverse charging control IGBT T-co are respectively selected in accordance with the system's voltage-current ratings at a direct current side, frequency in simulated working conditions, and set power levels. Gates of all IGBTs (including the forward charging control IGBT T-ci, the discharging control IGBT T-d, and the reverse charging control IGBT T-co) are respectively connected to corresponding IGBT drivers, and the forward charging control IGBT T-ci, the discharging control IGBT T-d, and the reverse charging control IGBT T-co are controlled by their respective corresponding IGBT drivers.

Figure 3:
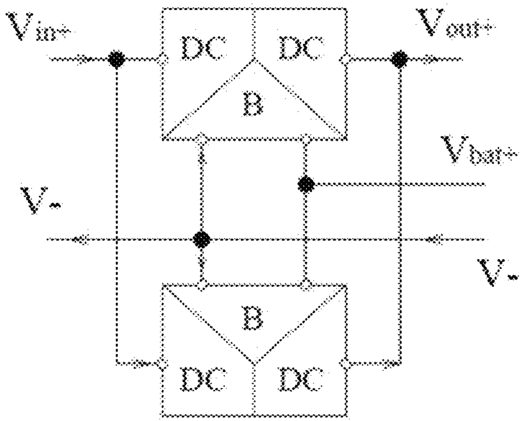
FIG. 3 is a schematic diagram of two DC power conversion devices with their ports connected in parallel.
Figure 6:
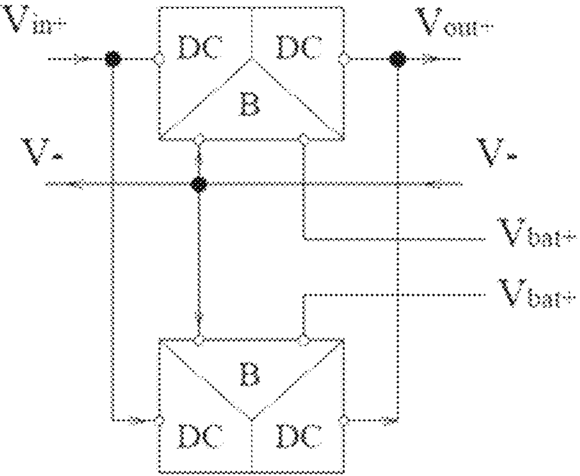
FIG. 6 is a schematic diagram of two DC power conversion devices with energy storage battery pack access ports Vbat+ being independent and other three ports being connected in parallel.

Direct current generated power input ports Vin+, direct current regulated power output ports Vout+, energy storage battery pack access ports Vbat+, and common negative electrode ports V− of several DC power conversion devices are connected in one-to-one correspondence in parallel to achieve a single-path power expansion function, and in this case, types of the energy storage battery packs connected to the energy storage battery pack access ports Vbat+ are the same, for example, the energy storage battery packs are all nickel-metal hydride battery packs, lithium ion battery packs, and the like; the direct current generated power input ports Vin+, the direct current regulated power output ports Vout+, and the common negative electrode ports V− of several DC power conversion devices are connected in one-to-one correspondence in parallel, each energy storage battery pack access port Vbat+ is independent to achieve a capacity expansion function or a hybrid energy storage combination function, and the types of the energy storage battery packs correspondingly connected to the energy storage battery pack access ports Vbat+ are all the same or partly the same, partly different or completely different, for example, when a quantity of the DC power conversion devices is three, the energy storage battery packs correspondingly connected to the energy storage battery pack access ports Vbat+ of the three DC power conversion devices are all nickel-metal hydride battery packs; or the energy storage battery packs correspondingly connected to the energy storage battery pack access ports Vbat+ of two of the DC power conversion devices are nickel-metal hydride battery packs, and the energy storage battery pack correspondingly connected to the energy storage battery pack access port Vbat+ of the other DC power conversion device is a lithium ion battery pack; or the energy storage battery pack correspondingly connected to the energy storage battery pack access port Vbat+ of one DC power conversion device is a nickel-metal hydride battery pack, the energy storage battery pack correspondingly connected to the energy storage battery pack access port Vbat+ of one DC power conversion device is a lithium ion battery pack, and the energy storage battery pack correspondingly connected to the energy storage battery pack access port Vbat+ of one DC power conversion device is a lead-acid battery pack. FIG. 3 is a schematic diagram of two DC power conversion devices with their ports connected in parallel, and FIG. 6 is a schematic diagram of two DC power conversion devices with energy storage battery pack access ports Vbat+ being independent and other three ports being connected in parallel.

Figure 4:
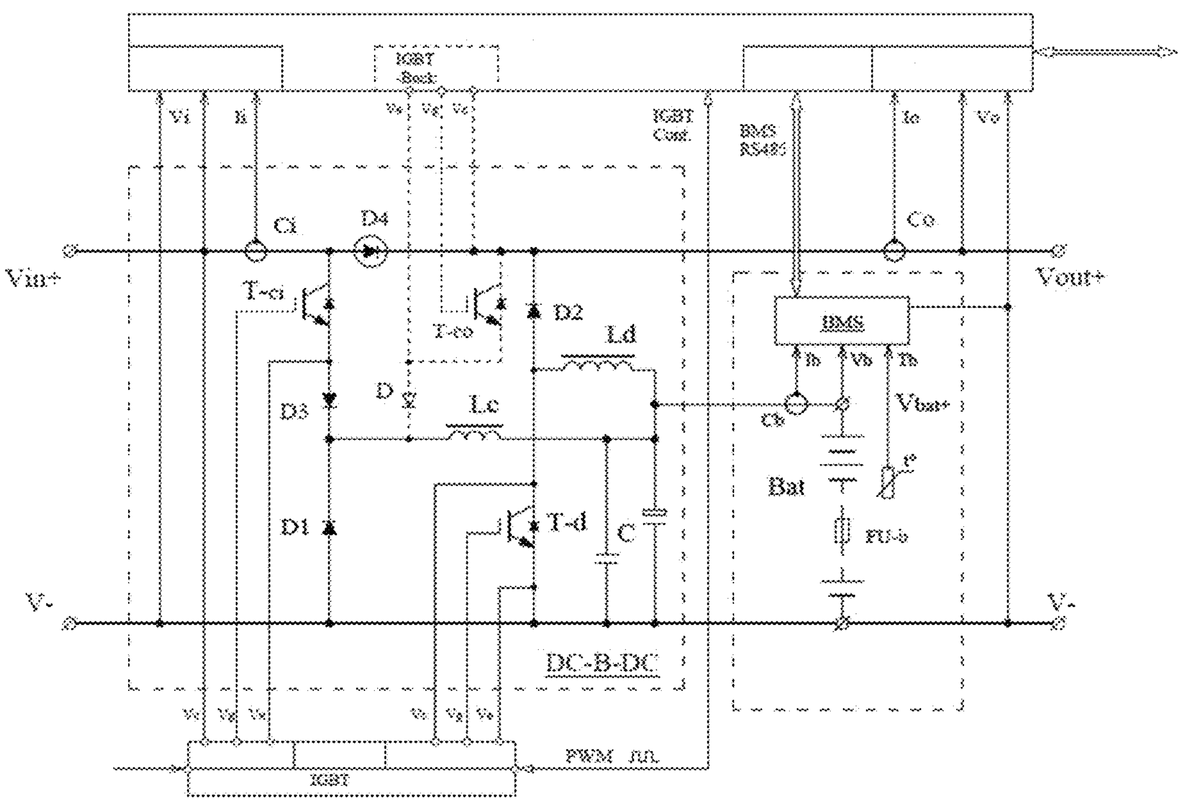
FIG. 4 is a schematic diagram of a DC power conversion device connected to various components.
Figure 5:
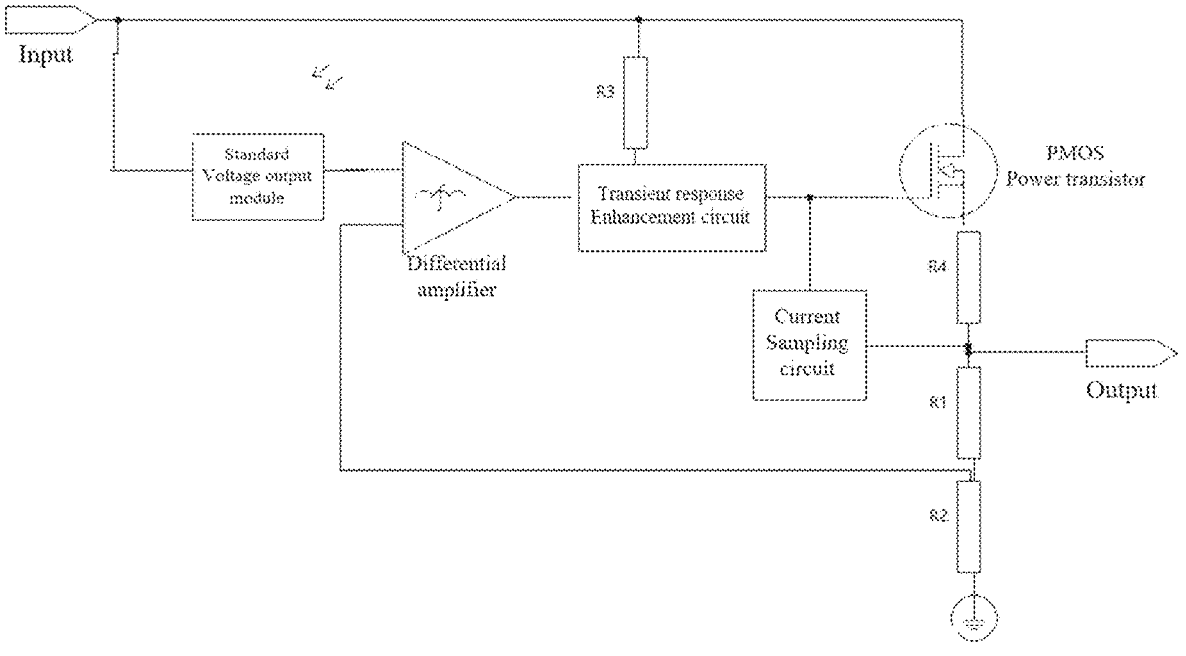
FIG. 5 is a structural diagram of a denoising circuit.

FIG. 4 shows a schematic diagram of a DC power conversion device connected to various control components, in which new energy sources such as photovoltaic power are correspondingly connected to the direct current generated power input port Vin+ and the common negative electrode port V− of the DC power conversion device; direct current sides of power loads such as DC-AC inverter PCS are correspondingly connected to the direct current regulated power output port Vout+ and the common negative electrode port V− of the DC power conversion device; and the positive electrode end and the negative electrode end of the energy storage battery pack are correspondingly connected to the energy storage battery pack access port Vbat+ and the common negative electrode port V− of the DC power conversion device. Generally, the energy storage battery pack is configured in a way that a direct current generated power input voltage is higher than an operating voltage and lower than or equal to a direct current regulated power output voltage (generally, a rated input voltage at a direct current side of a low-voltage frequency DC-AC inverter PCS is about 750 Vdc), and the energy storage battery pack is provided with an independent battery management system BMS.

Embodiment 2

The direct current power output port is also connected in series to a denoising circuit to provide a stable direct current output, and the denoising circuit includes a differential amplifier, a standard voltage output module, a current sampling circuit, a transient response enhancement circuit, a PMOS transistor, and four resistance negative feedback networks; wherein the differential amplifier, the standard voltage output module, the current sampling circuit, the transient response enhancement circuit, the PMOS transistor, and the four resistance negative feedback networks form a closed loop, the standard voltage output module is connected to the differential amplifier, an input power supply is connected to a resistor R3, the standard voltage output module and the PMOS power transistor, the standard voltage output module is connected to the differential amplifier, the differential amplifier is connected to an input end of the transient response enhancement circuit, an output end of the transient response enhancement circuit is connected to the PMOS power transistor and an input end of the current sampling circuit, an output end of the current sampling circuit is connected to a resistor R1, and an output end of the PMOS power transistor is connected to a resistor R4, wherein the standard voltage output module uses a band-gap reference circuit to generate a voltage, a resistor R2 is grounded, and the differential amplifier is connected to the resistor R1. The denoising circuit provided in the present application can dramatically reduce voltage ripples. Through a feedback network composed of the resistor R1, the resistor R2, the resistor R3 and the resistor R4, outputs of the transient response circuit, the current sampling circuit and the PMOS power transistor are comprehensively adjusted respectively, and an output voltage is fed back to the differential amplifier. The resistance network greatly enhances the stability of the output voltage; and the transient response enhancement circuit greatly enhances the transient response capability. According to the present application, the use of the PMOS transistor and the arrangement of the resistance feedback network structure have a great inhibitory effect on voltage noise.

The DC power conversion device based on resistance feedback networks of the present invention has a simple structure and is easy to modularize. Charging and discharging power can be expanded on demand when external ports are directly connected in parallel, and different types of energy storage battery packs can be accessed separately when the energy storage battery pack access ports Vbat+ are independently separated, so as to form a hybrid energy storage circuit while expanding the capacity. The DC power conversion device that outputs a stable voltage based on resistance feedback networks is mainly applied in energy storage systems having relatively frequent input energy fluctuations and based on direct current buses. A main feature thereof is that input-output ends are relatively isolated, and the energy storage battery packs are connected between the input-output ends in parallel, forming an "H"-shaped structure. The charging and discharging circuits can either work independently at different times, or work simultaneously based on capacitor effect of the battery packs. The key is that due to the unidirectional characteristic of the charging-discharging circuits, the discharging side is always active without bidirectional switching, which improves the response speed and safety and reliability of the energy storage system.

Energy storage systems are divided into several basic types such as power type, capacity type and hybrid type according to different power loads to be handled, and considering factors such as combined costs and management and control, the same type of batteries are often suitable for only one of the energy storage types. Hybrid energy storage is the best choice for some power grids (such as regional power grids and microgrids) and loads with special requirements, which have short-time high power requirements and long-time capacity requirements. Different types of batteries within the same energy storage system cannot be directly connected in parallel. Through the DC power conversion device that outputs a stable voltage based on resistance feedback networks, various types of battery packs (including but not limited to nickel-metal hydride battery packs, lithium ion battery packs and the like) can be grouped and connected in parallel, an output ratio is coordinated by the control system according to load demands during application, and the battery packs are always active without switching. Moreover, energy input on the power generation side is responded at any time, such that the energy storage battery packs are active all the time in a state of dynamic adjustment of incoming and outgoing electric energy, and play a better role as an electric energy buffer.

The DC power conversion device based on resistance feedback networks of the present invention greatly improves the reverse charging efficiency by arranging a reverse charging control IGBT (T-co), a first reverse charging isolation diode (D) and a second reverse charging isolation diode (D3). The second reverse charging isolation diode (D3) is connected in series to a connecting line of the forward charging control IGBT (T-ci) and the charging flyback diode (D1), a cathode of the second reverse charging isolation diode (D3) is connected to one end of the charging energy storage inductor (Lc), a collector of the reverse charging control IGBT (T-co) is connected to the direct current regulated power output port (Vout+), an emitter of the reverse charging control IGBT (T-co) is connected to an anode of the first reverse charging isolation diode (D), a cathode of the first reverse charging isolation diode (D) is connected to one end of the charging energy storage inductor (Lc), and the reverse charging control IGBT (T-co) and the first reverse charging isolation diode (D) together form a reverse independent charging loop, thereby greatly improving the reverse charging efficiency.

In addition, according to the present application, simultaneous high-frequency and low-frequency filtering is achieved by arranging a high-frequency filter capacitor and a low-frequency filter electrolytic capacitor, and the output frequency stability of the circuit is greatly improved by combining the circuit with the high-frequency filter capacitor and the low-frequency filter electrolytic capacitor.

Embodiment 3

The DC power conversion device in another embodiment includes a direct current generated power input port Vin+, a direct current regulated power output port Vout+, an energy storage battery pack access port Vbat+, a common negative electrode port V−, a forward charging control insulated gate bipolar transistor (IGBT) T-ci, a charging energy storage inductor Lc, a charging flyback diode D1, a discharging control IGBT T-d, a discharging energy storage inductor Ld, a discharging flyback diode D2, an input-output straight-through and reverse isolation diode D4, and an energy storage battery pack; wherein the direct current power output port (Vout+) is connected in series to a denoising circuit to provide a stable direct current output, and the denoising circuit includes a differential amplifier, a standard voltage output module, a current sampling circuit, a transient response enhancement circuit, a PMOS power transistor, and four resistance negative feedback networks; wherein the differential amplifier, the standard voltage output module, the current sampling circuit, the transient response enhancement circuit, the PMOS power transistor, and the four resistance negative feedback networks form a closed loop, the standard voltage output module is connected to the differential amplifier, an input power supply is connected to a resistor R3, the standard voltage output module and the PMOS power transistor, the standard voltage output module is connected to the differential amplifier, the differential amplifier is connected to an input end of the transient response enhancement circuit, an output end of the transient response enhancement circuit is connected to the PMOS power transistor and an input end of the current sampling circuit, an output end of the current sampling circuit is connected to a resistor R1, and an output end of the PMOS power transistor is connected to a resistor R4, wherein the standard voltage output module uses a band-gap reference circuit to generate a voltage, a resistor R2 is grounded, and the differential amplifier is connected to the resistor R1.

In some embodiments, an anode of the input-output straight-through and reverse isolation diode D4 and a collector of the forward charging control IGBT T-ci are respectively connected to the direct current generated power input port Vin+, a cathode of the input-output straight-through and reverse isolation diode D4 and a cathode of the discharging flyback diode D2 are respectively connected to the direct current regulated power output port Vout+, an emitter of the forward charging control IGBT T-ci is connected to a cathode of the charging flyback diode D1, a collector of the discharging control IGBT T-d is connected to an anode of the discharging flyback diode D2, one end of the charging energy storage inductor Lc is connected to a connecting end of the forward charging control IGBT T-ci and the charging flyback diode D1, one end of the discharging energy storage inductor Ld is connected to a connecting end of the discharging control IGBT T-d and the discharging flyback diode D2, the other end of the charging energy storage inductor Lc, the other end of the discharging energy storage inductor Ld and a positive electrode end of the energy storage battery pack are respectively connected to the energy storage battery pack access port Vbat+, and an anode of the charging flyback diode D1, a negative electrode end of the energy storage battery pack and an emitter of the discharging control IGBT T-d are respectively connected to the common negative electrode port V−.

In some embodiments, the DC power conversion device further includes a reverse charging control IGBT T-co, a first reverse charging isolation diode D and a second reverse charging isolation diode D3, wherein the second reverse charging isolation diode D3 is connected in series to a connecting line of the forward charging control IGBT T-ci and the charging flyback diode D1, a cathode of the second reverse charging isolation diode D3 is connected to one end of the charging energy storage inductor Lc, a collector of the reverse charging control IGBT T-co is connected to the direct current regulated power output port Vout+, an emitter of the reverse charging control IGBT T-co is connected to an anode of the first reverse charging isolation diode D, a cathode of the first reverse charging isolation diode D is connected to one end of the charging energy storage inductor Lc, and the reverse charging control IGBT T-co and the first reverse charging isolation diode D together form a reverse independent charging loop.

In some embodiments, the forward charging control IGBT T-ci, the charging energy storage inductor Lc and the charging flyback diode D1 together form a buck charging circuit, and the discharging control IGBT T-d, the discharging energy storage inductor Ld and the discharging flyback diode D2 together form a boost discharging circuit; and the buck charging circuit, the energy storage battery pack and the boost discharging circuit together form an “H”-shaped DC-B-DC circuit architecture.

In some embodiments, the DC power conversion device further includes a high-frequency filter capacitor and a low-frequency filter electrolytic capacitor, wherein a positive electrode end of the low-frequency filter electrolytic capacitor is connected to the energy storage battery pack access port Vbat+, a negative electrode end of the low-frequency filter electrolytic capacitor is connected to the common negative electrode port V−, and two ends of the high-frequency filter capacitor are connected to two ends of the low-frequency filter electrolytic capacitor in parallel.

In some embodiments, a battery management system is arranged in the energy storage battery pack, and the energy storage battery pack may be a nickel-metal hydride battery pack, a lithium ion battery pack, a lead-acid battery pack, and the like. Gates of all IGBTs (including the forward charging control IGBT T-ci, the discharging control IGBT T-d and the reverse charging control IGBT T-co) are respectively connected to corresponding IGBT drivers, and the forward charging control IGBT T-ci, the discharging control IGBT T-d, and the reverse charging control IGBT T-co are controlled by their respective corresponding IGBT drivers.

In some embodiments, direct current generated power input ports Vin+, direct current regulated power output ports Vout+, energy storage battery pack access ports Vbat+, and common negative electrode ports V− of several DC power conversion devices are connected in one-to-one correspondence in parallel to achieve a single-path power expansion function, and in this case, types of the energy storage battery packs connected to the energy storage battery pack access ports Vbat+ are the same, for example, the energy storage battery packs are all nickel-metal hydride battery packs, lithium ion battery packs, and the like; the direct current generated power input ports Vin+, the direct current regulated power output ports Vout+, and the common negative electrode ports V− of the several DC power conversion devices are connected in one-to-one correspondence in parallel, each energy storage battery pack access port Vbat+ is independent to achieve a capacity expansion function or a hybrid energy storage combination function, and the types of the energy storage battery packs correspondingly connected to the energy storage battery pack access ports Vbat+ are all the same or partly the same, partly different or completely different. For example, when a quantity of the DC power conversion devices is three, the energy storage battery packs correspondingly connected to the energy storage battery pack access ports Vbat+ of the three DC power conversion devices are nickel-metal hydride battery packs; or the energy storage battery packs correspondingly connected to the energy storage battery pack access ports Vbat+ of two of the DC power conversion devices are nickel-metal hydride battery packs, and the energy storage battery pack correspondingly connected to the energy storage battery pack access port Vbat+ of the other DC power conversion device is a lithium ion battery pack; or the energy storage battery pack correspondingly connected to the energy storage battery pack access port Vbat+ of one DC power conversion device is a nickel-metal hydride battery pack, the energy storage battery pack correspondingly connected to the energy storage battery pack access port Vbat+ of one DC power conversion device is a lithium ion battery pack, and the energy storage battery pack correspondingly connected to the energy storage battery pack access port Vbat+ of one DC power conversion device is a lead-acid battery pack.

The present invention provides a DC power conversion device based on resistance feedback networks, and beneficial technical effects that can be achieved are as follows:

The DC power conversion device provided in the present invention has a simple structure and is easy to be modularized, forming an "H"-shaped structure. The charging and discharging circuits can either work independently at different times, or work simultaneously based on the capacitor effect of the battery packs. Due to unidirectional characteristics of the charging-discharging circuits, the discharging side is always active without bidirectional switching, which improves the response speed, safety, and reliability of the energy storage system. According to the present invention, various types of battery packs can be grouped and connected in parallel, an output ratio is coordinated by the control system according to load demands during the application, and the battery packs are always active without switching. Moreover, energy input at the power generation side is responded at any time, so that the energy storage battery packs are active all the time in a dynamic state of adjusting between energy input and output, and play a better role as an electric energy buffer. The reverse charging control IGBT (T-co) and the first reverse charging isolation diode (D) together form a reverse independent charging loop, which greatly improves the reverse charging efficiency.

The denoising circuit provided in the present application can reduce voltage ripples. Through a feedback network composed of the resistor R1, the resistor R2, the resistor R3, and the resistor R4, outputs of the transient response circuit, the current sampling circuit, and the PMOS power transistor are comprehensively adjusted respectively, and output voltage is fed back to the differential amplifier. The resistance network greatly enhances the stability of the output voltage; the transient response enhancement circuit greatly enhances the transient response capability. According to the present application, the use of the PMOS transistor and the arrangement of the resistance feedback network structure have a great inhibitory effect on voltage noise.

A DC power conversion device is described in detail above. Specific examples are used herein to illustrate the principle and implementations of the present invention. The foregoing embodiments are described merely to help understand the core ideas of the present invention. Meanwhile, for those skilled in the art, there may be changes in the specific implementations and application scope according to the ideas and method of the present invention. To sum up, the content of the specification should not be construed as limitations to the present invention.

What is claimed is:

1. A DC power conversion device for bridging new energy generation, energy storage and microgrid, comprising a direct current generated power input port (Vin+), a direct current regulated power output port (Vout+), an energy storage battery pack access port (Vbat+), a common negative electrode port (V−), a forward charging control IGBT (T-ci), a charging energy storage inductor (Lc), a charging flyback diode (D1), a discharging control IGBT (T-d), a discharging energy storage inductor (Ld), a discharging flyback diode (D2), an input-output straight-through and reverse isolation diode (D4), and an energy storage battery pack; wherein the direct current power output port (Vout+) is connected in series to a denoising circuit to provide a stable direct current output, and the denoising circuit comprises a differential amplifier, a standard voltage output module, a current sampling circuit, a transient response enhancement circuit, a PMOS power transistor, and four resistance negative feedback networks; wherein the differential amplifier, the standard voltage output module, the current sampling circuit, the transient response enhancement circuit, the PMOS power transistor, and the four resistance negative feedback networks form a closed loop, the standard voltage output module is connected to the differential amplifier, an input power supply is connected to a resistor R3, the standard voltage output module and the PMOS power transistor, the standard voltage output module is connected to the differential amplifier, the differential amplifier is connected to an input end of the transient response enhancement circuit, an output end of the transient response enhancement circuit is connected to the PMOS power transistor and an input end of the current sampling circuit, an output end of the current sampling circuit is connected to a resistor R1, and an output end of the PMOS power transistor is connected to a resistor R4, wherein the standard voltage output module uses a band-gap reference circuit to generate a voltage, a resistor R2 is grounded, and the differential amplifier is connected to the resistor R1.

2. The DC power conversion device for bridging new energy generation, energy storage and microgrid according to claim 1, wherein an anode of the input-output straight-through and reverse isolation diode (D4) and a collector of the forward charging control IGBT (T-ci) are respectively connected to the direct current generated power input port (Vin+), a cathode of the input-output straight-through and reverse isolation diode (D4) and a cathode of the discharging flyback diode (D2) are respectively connected to the direct current regulated power output port (Vout+), an emitter of the forward charging control IGBT (T-ci) is connected to a cathode of the charging flyback diode (D1), a collector of the discharging control IGBT (T-d) is connected to an anode of the discharging flyback diode (D2), one end of the charging energy storage inductor (Lc) is connected to a connecting end of the forward charging control IGBT (T-ci) and the charging flyback diode (D1), one end of the discharging energy storage inductor (Ld) is connected to a connecting end of the discharging control IGBT (T-d) and the discharging flyback diode (D2), the other end of the charging energy storage inductor (Lc), the other end of the discharging energy storage inductor (Ld) and a positive electrode end of the energy storage battery pack are respectively connected to the energy storage battery pack access port (Vbat+), and an anode of the charging flyback diode (D1), a negative electrode end of the energy storage battery pack and an emitter of the discharging control IGBT (T-d) are respectively connected to the common negative electrode port (V−).

3. The DC power conversion device for bridging new energy generation, energy storage and microgrid according to claim 1, further comprising a reverse charging control IGBT (T-co), a first reverse charging isolation diode (D) and a second reverse charging isolation diode (D3), wherein the second reverse charging isolation diode (D3) is connected in series to a connecting line of the forward charging control IGBT (T-ci) and the charging flyback diode (D1), a cathode of the second reverse charging isolation diode (D3) is connected to one end of the charging energy storage inductor (Lc), a collector of the reverse charging control IGBT (T-co) is connected to the direct current regulated power output port (Vout+), an emitter of the reverse charging control IGBT (T-co) is connected to an anode of the first reverse charging isolation diode (D), a cathode of the first reverse charging isolation diode (D) is connected to one end of the charging energy storage inductor (Lc), and the reverse charging control IGBT (T-co) and the first reverse charging isolation diode (D) together form a reverse independent charging loop.

4. The DC power conversion device for bridging new energy generation, energy storage and microgrid according to claim 2, wherein the forward charging control IGBT (T-ci), the charging energy storage inductor (Lc) and the charging flyback diode (D1) together form a buck charging circuit, and the discharging control IGBT (T-d), the discharging energy storage inductor (Ld) and the discharging flyback diode (D2) together form a boost discharging circuit; and the buck charging circuit, the energy storage battery pack and the boost discharging circuit together form an "H"-shaped DC-B-DC circuit architecture.

5. The DC power conversion device for bridging new energy generation, energy storage and microgrid according to claim 1, further comprising a high-frequency filter capacitor and a low-frequency filter electrolytic capacitor, wherein a positive electrode end of the low-frequency filter electrolytic capacitor is connected to the energy storage battery pack access port (Vbat+), a negative electrode end of the low-frequency filter electrolytic capacitor is connected to the common negative electrode port (V−), and two ends of the high-frequency filter capacitor are connected to two ends of the low-frequency filter electrolytic capacitor in parallel.

6. The DC power conversion device for bridging new energy generation, energy storage and microgrid according to claim 1, wherein direct current generated power input ports (Vin+), direct current regulated power output ports (Vout+), energy storage battery pack access ports (Vbat+), and common negative electrode ports (V−) of several DC power conversion devices are connected in one-to-one correspondence in parallel to achieve a single-path power expansion function, and in this case, types of the energy storage battery packs connected to the energy storage battery pack access ports (Vbat+) are the same; the direct current generated power input ports (Vin+), the direct current regulated power output ports (Vout+), and the common negative electrode ports (V−) of the several DC power conversion devices are connected in one-to-one correspondence in parallel, each energy storage battery pack access port (Vbat+) is independent to achieve a capacity expansion function or a hybrid energy storage combination function, and the types of the energy storage battery packs correspondingly connected to the energy storage battery pack access ports (Vbat+) are all the same or partly the same, partly different or completely different.

* * * * *